Nov. 2, 1943.     G. DORN ET AL     2,333,301
PORTABLE EXPANSION WIRE REEL
Filed June 24, 1942     4 Sheets-Sheet 1
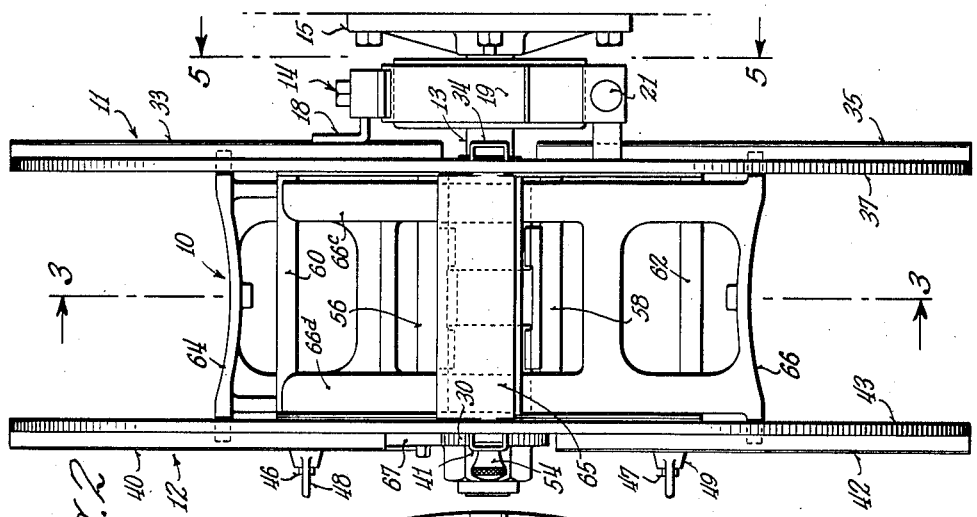
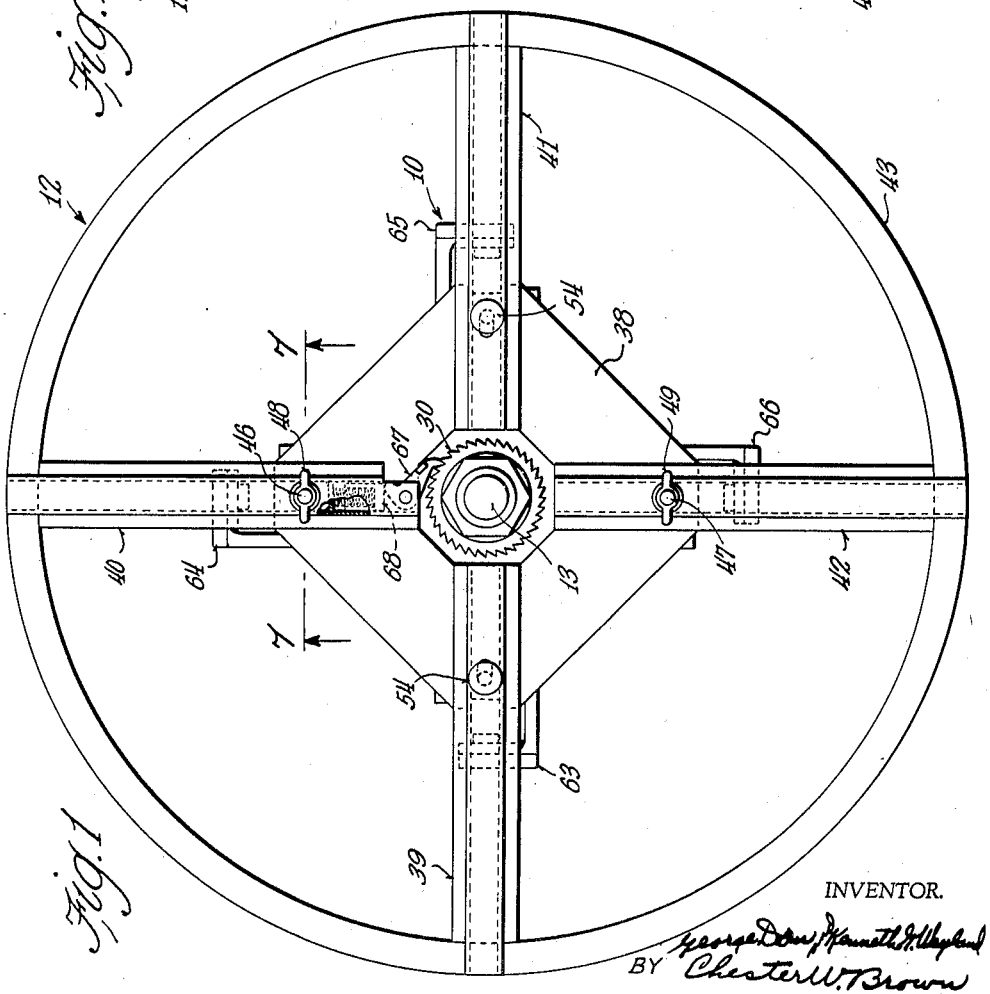
INVENTOR.
George Dorn, Kenneth G. Wayland
BY Chester W. Brown
ATTORNEY.

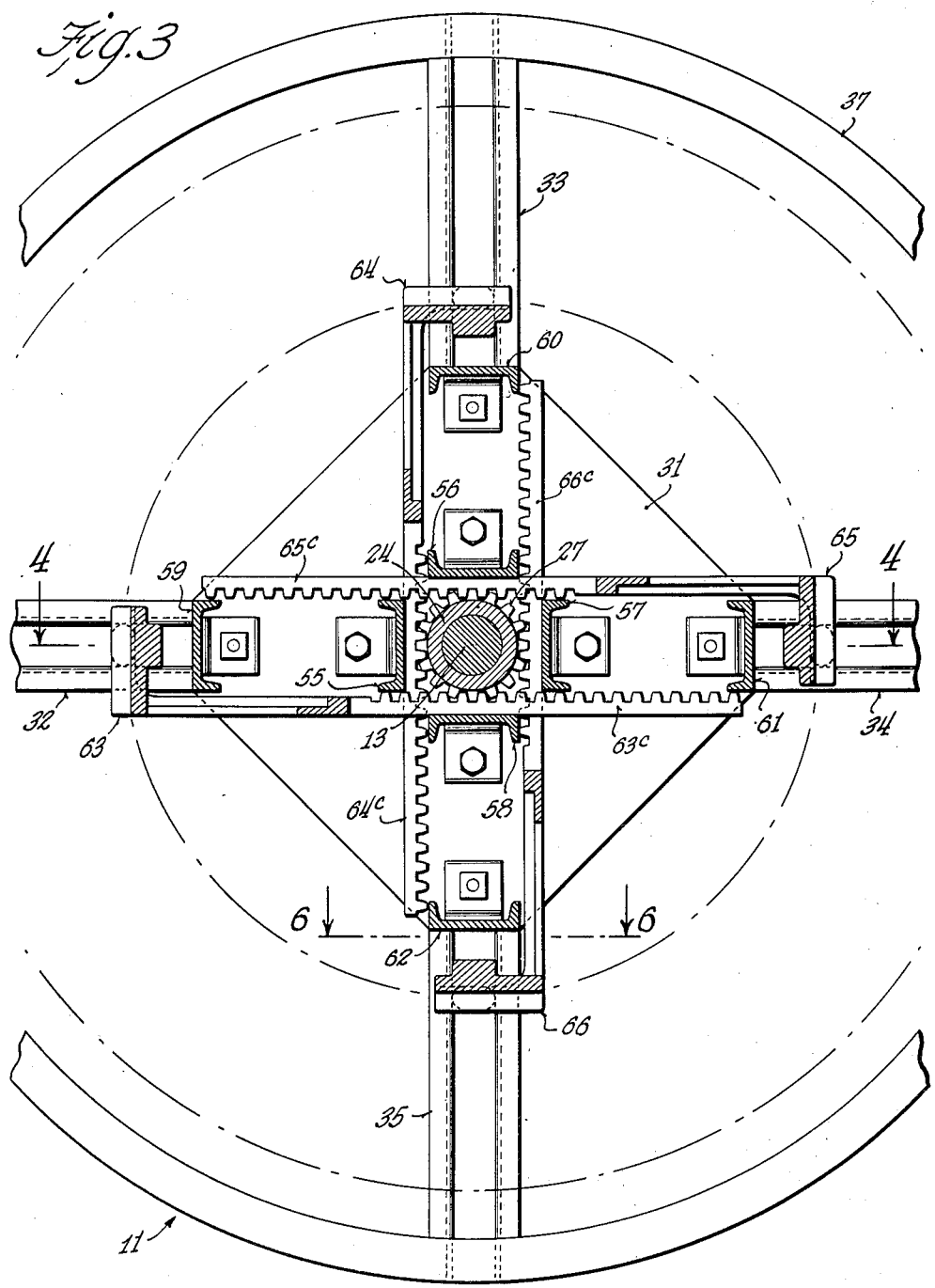

Nov. 2, 1943.    G. DORN ET AL    2,333,301
PORTABLE EXPANSION WIRE REEL
Filed June 24, 1942    4 Sheets-Sheet 3
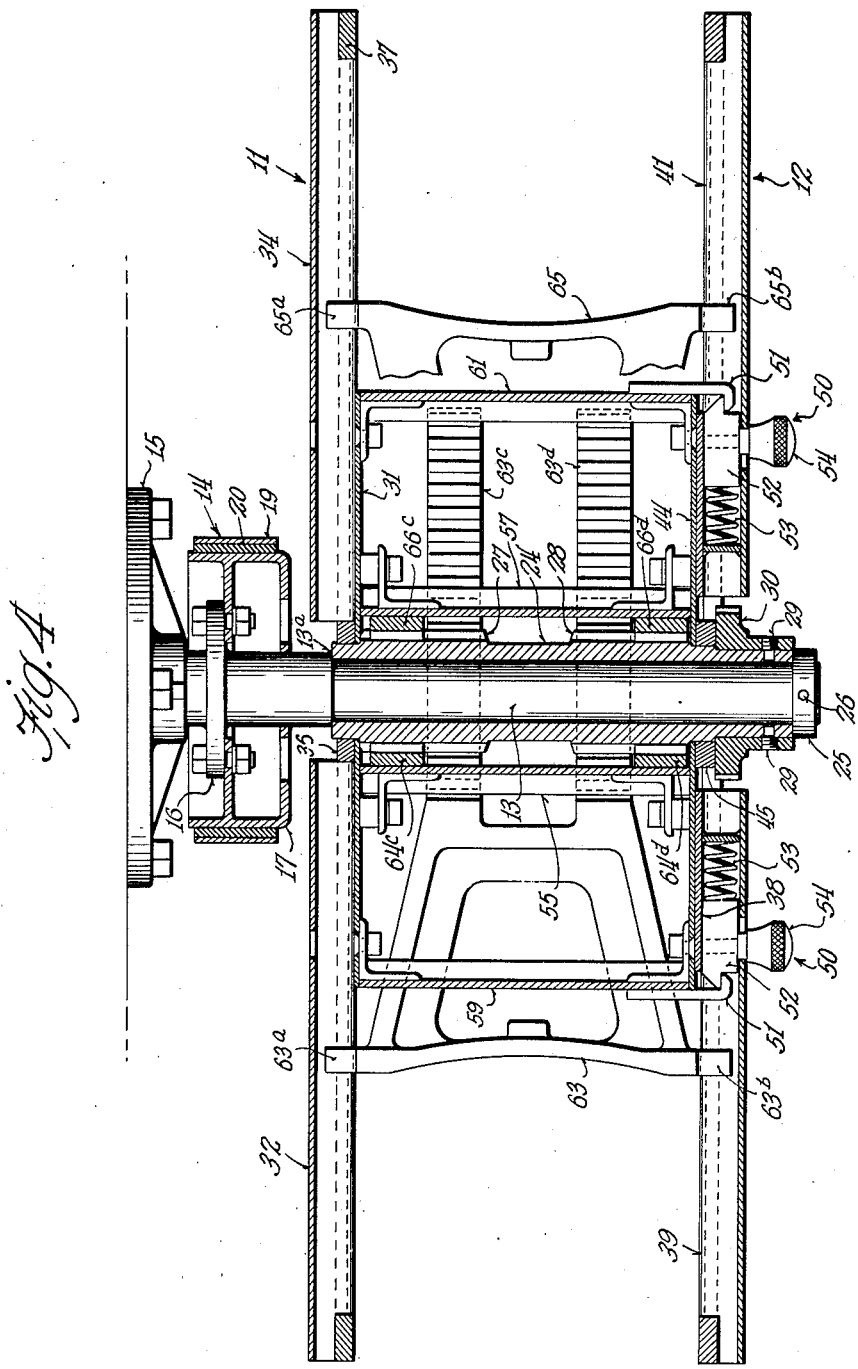

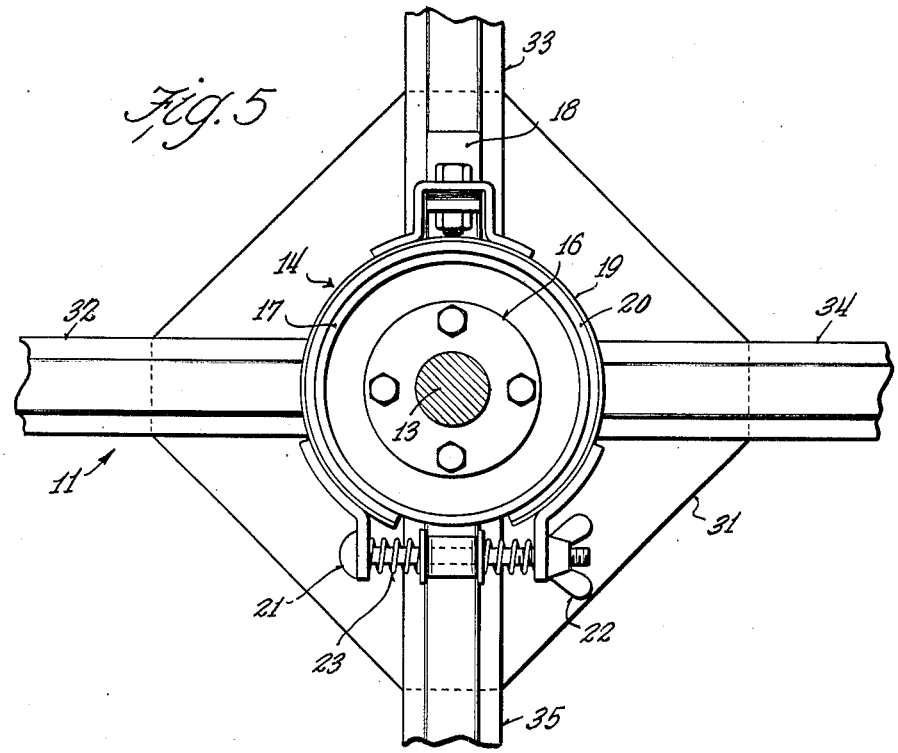
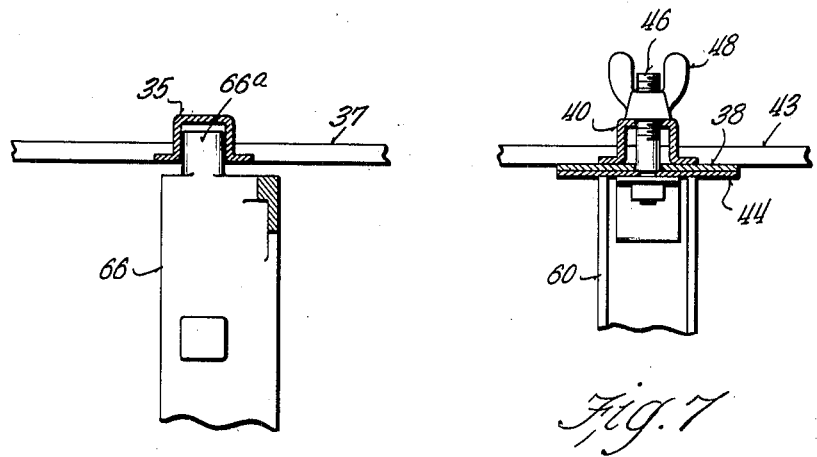

Patented Nov. 2, 1943

2,333,301

UNITED STATES PATENT OFFICE 2,333,301

PORTABLE EXPANSION WIRE REEL

George Dorn, Milwaukee, and Kenneth G. Weyland, Wauwatosa, Wis., assignors to Line Material Company, Milwaukee, Wis., a corporation of Delaware Application June 24, 1942, Serial No. 448,242

5 Claims. (Cl. 242—113)

This invention relates to reels for paying out wire and the like; and it has for its primary object to provide a reel having a hub which is manually expansible and contractible to accommodate coils of wire having a variety of internal diameters.

A further object is to provide a reel wherein the hub can be expanded in a manner effective to center the coil therewith and to frictionally engage the coil at points all around its inner circumference, to the end that the coil shall be concentric with the reel and rotationally balanced and drivingly engaged with the reel.

Another object is to provide an adjustable reel of the aforementioned character which will retain the diametric expansion to which it is adjusted until the coil of wire thereon is all payed out, unless purposely readjusted in the meantime.

Other objects are to provide a wire reel of the above-mentioned character which is quick and easy to operate and which can be manufactured at a cost which is not prohibitive.

In the drawings which accompany this specification:

Fig. 1 is an endwise elevational view of the reel;

Fig. 2 is an edgewise view of the reel—being a third-angle projection of Fig. 1;

Fig. 3 is a sectional view taken along the line 3—3 of Fig. 2;

Fig. 4 is a sectional view taken along the line 4—4 of Fig. 3;

Fig. 5 is an enlarged fragmentary view taken along the line 5—5 of Fig. 2 and showing, particularly, the brake structure;

Fig. 6 is a sectional view at 6—6, Fig. 3, showing a detail of construction; and Fig. 7 is an enlarged sectional view along the line 7—7 of Fig. 1.

The wire reel illustrated was designed more especially for use in stringing electric power and telephone wires and would most frequently be mounted on the side or rear of a service truck, but is not subject to any limitation in that respect.

Power transmission and telephone wire is put up in coils which, to avoid excessive bending of the wire, have rather large center openings which vary considerably in diameter.

The old practice involved the use of a reel having a fixed hub diameter which, of course, had to be small enough to accommodate coils of the smallest interior diameter likely to be encountered. Manifestly, the coil was out of balance with reference to the reel—which condition increased the effort required to pay out the wire and made it necessary, usually, for a man to stand at the reel and turn it. Moreover, as will be almost self-evident, there was an annoying tendency for the loops of wire on the coil to become interlocked if it were attempted to turn the reel by pulling on the payed-out wire. By virtue of its expansible hub the reel structure illustrated avoids the aforementioned deficiencies to a very material extent.

The major components and sub-assemblies of the new reel are the expansible and contractible hub 10, the rear flange 11, the removable front flange 12, the center-shaft or axle 13 on which the hub and flanges are rotatably supported, and the mechanism by which expansion and contraction of the hub is manually effected. The latter has not been given a general reference numeral but its several parts have been identified specifically. There is, in addition, a drag brake 14 which serves to restrain the reel against over-running. Front flange 12 is removable to permit filling of the reel.

For mounting the reel on a truck or otherwise, there is provided a flange 15 to which is rigidly attached horizontally extending center-shaft or axle 13—which does not rotate.

Welded to shaft 13 is a flange 16 (Fig. 4) to which, in turn, is bolted a stationary brake drum 17; and attached to rear flange 11 by anglestrap 18 (Figs. 2 and 5) is a brake-band 19 having a lining 20—which brake-band and lining rotate with the reel while the lining frictionally engages the stationary drum. The brake pressure is regulated by means of a bolt 21 and wing nut 22 which serves to draw the brake band into engagement with the drum. And a spring 23 serves to disengage the brake when wingnut 22 is loosened.

A long sleeve member 24 is carried by and rotatable on shaft 13 and is located at one end by a shoulder 13a, and held in place by a collar 25 and pin 26.

On the exterior of and integral with sleeve member 24 are two pinions 27 and 28 respectively; and secured to the outer end of said sleeve member by means of set-screws 29 is a ratchet 30, which rotates with the sleeve member.

The rear and front flanges 11 and 12 respectively are mounted on sleeve member 24 and are rotatable thereon to a limited extent, for a reason hereinafter to be explained, but they do not rotate relatively to the sleeve member when wire is being payed out.

The front and rear flanges are similar in construction but not identical. Rear flange 11 comprises a center plate 31 (see Figs. 3, 4, and 5) from which extends radially four arms, 32, 33, 34, and 35, of special channel-shape cross-section (see Fig. 6). The center-plate 31 is reinforced at its axial opening by a ring 36 which is bored to fit the sleeve member; and the outer ends of arms 32—35 are interconnected by a ring 37 which forms the rim of the flange.

Front flange 12 comprises a center plate 38 (see Figs. 1 and 4) from which extends four radial arms, 39, 40, 41, and 42, respectively, of special channel-shape cross-section (see Fig. 7); and the outer ends of said radial arms are interconnected by a ring 43 which forms the rim of the flange. The front flange is removably carried by a web-plate 44 (Fig. 4) which is welded to a center ring 45—which latter is bored to fit the sleeve member. Removable attachment of the front flange to web-plate 44 is effected by means of a pair of studs 46 and 47 and wing nuts 48 and 49 (Figs. 1 and 7) together with a pair of oppositely disposed latch means, identified as a whole by reference numeral 50. The latter each comprise a latch plate 51, latch 52, latch spring 53, and knob 54. The latches snap into engagement when the front flange is pushed into place, and they are releasable for removing the front flange by moving the knobs toward center. Wing nuts 48 and 49 must, of course, be removed before the front flange can be withdrawn.

Web-plate 44 is tied to center-plate 31 of the rear flange by means of four laterally extending inner channels 55, 56, 57, and 58 and four laterally extending outer channels 59, 60, 61, and 62.

The expansible and contractible hub which supports the coil of wire comprises four carrier members 63, 64, 65, and 66, respectively, bridging the space between the front and rear flanges and having integral guide lugs 63a, 63b, etc. (Fig. 4) which project into the channels of radial arms 32, 33, 34, and 35 of the rear flange and radial arms 39, 40, 41, and 42 of the front flange. The carrier members are designed to move radially in and out, toward and away from the center of rotation of the hub, all at the same time—thereby varying the diameter of the hub to suit the inner diameter of the coil of wire mounted thereon.

Each carrier member includes a pair of laterally spaced parallel racks which are identified by reference numerals 63c, 63d, 64c, 64d, etc. Carrier member 63 and its racks 63c and 63d are shown in elevation in Fig. 4 and in longitudinal section in Fig. 3. The four pairs of racks are arranged in quadrature, as shown in Fig. 3, and one of each pair engages pinion 27 while the remainder of each pair engages pinion 28.

It can now be seen that if sleeve member 24 together with pinions 27 and 28 are rotated while the front and rear flanges are restrained against rotation, the several racks will be reciprocated and the carrier members will be moved outwardly or inwardly, as the case may be, depending upon the direction of rotation. Rotating the sleeve member and pinions clockwise as viewed in Fig. 1 causes the carrier members to move outwardly, while counter-clockwise rotation has the reverse effect. Rotation of the sleeve member and pinions is accomplished by applying a special wrench, not shown, to the hexed hub of ratchet member 30.

The weight of the wire coil tends to cause the hub to collapse, and it is the function of ratchet wheel 30 and its dog 67 to lock the hub in any of its several radial positions of adjustment. The dog is held yieldably in engagement with the ratchet by means of a spring pressed plunger at 68 and can be released manually.

To load the reel the hub is first contracted, then the front flange is removed. The coil of wire can then be mounted on the hub, after which the front flange is replaced and the hub expanded until it engages the coil all around. The reel will rotate freely in response to a pull on the wire, but to prevent the reel overrunning, the brake should be adjusted to place a slight drag thereon.

What is claimed is:

1. A reel comprising: an axle, a sleeve member carried by and rotatable on said axle, flanges spaced axially in face-to-face relation and carried by said sleeve member, said flanges being rotatable with said sleeve member and also rotatable to a limited extent relatively to said sleeve member, a plurality of carrier members spaced angularly about the center of rotation of said sleeve member and between said flanges, said carrier members being movable radially toward and away from said center of rotation, said flanges being provided with means for guiding said carrier members radially, and manually operable mechanism interconnecting said sleeve member and said carrier members for effecting simultaneous radial movement of said carrier members, at least one of said flanges being removable to facilitate loading said carrier members.

2. A reel comprising: a plurality of carrier members spaced angularly about a common center of revolution and simultaneously movable radially toward and away from said center, a rotatable sleeve member coaxial with said center of revolution, a pinion carried and rotatable by said sleeve member and co-axial therewith, a plurality of racks meshing with said pinion and individual to said carrier members and drivingly interconnecting said carrier members with said pinion whereby to effect radially directed movements of said carrier members, a ratchet carried and rotatable by said sleeve member and co-axial therewith, a dog engageable with said ratchet to prevent contractile movements of said carrier members, and a pair of flanges spaced apart in face-to-face relation, said flanges being carried by and rotatable with said sleeve member, said flanges including means for guiding said carrier members radially, at least one of said flanges being removable to facilitate loading said carrier members.

3. A reel comprising: a stationary axle, a sleeve member carried by and rotatable on said axle, a pair of flanges spaced apart in face-to-face relation and carried by and rotatable with said sleeve member, said flanges each including a plurality of angularly spaced radially extending guide members arranged in pairs, the members of each pair of said guide members being individual to said flanges respectively and disposed oppositely, a plurality of carrier members spaced angularly about the center of rotation of said sleeve members, each of said carrier members being individual to and disposed between and radially guided by the members of an individual pair of said guide members, and mechanism including said sleeve member operative in response to rotation of said sleeve member relatively to said carrier members for simultaneously moving said carrier members radially, at least one of said flanges being removable to facilitate loading said carrier members.

4. A reel comprising: a stationary axle, a sleeve member carried by and rotatable on said axle, a pair of flanges spaced apart in face-to-face relation and carried by and rotatable with said sleeve member, said flanges being also rotatable on said sleeve member to a limited extent, said flanges including radially extending guide members arranged in oppositely disposed pairs, a plurality of carrier members spaced angularly about the center of rotation of said sleeve member and slidable along said guide members toward and away from said sleeve member, a plurality of racks, one for each of said carrier members individually, said racks being drivingly connected to their respective carrier members, a pinion carried by and rotatable with said sleeve member and drivingly in mesh with said racks, the arrangement being such that rotation of said sleeve member relatively to said carrier members effects simultaneous radial movement of said carrier members, said carrier members being maintained substantially equidistant from the center of rotation of said sleeve member.

5. A reel comprising: an axle, a sleeve carried by and rotatable on said axle, a rear flange carried by and rotatable on said sleeve, a web member carried by and rotatable on said sleeve, and spaced from said rear flange, a front flange carried by said web member, latch means for releasably securing said front flange to said web member, a plurality of carrier members disposed between said flanges concentrically with said axle and spaced circumferentially around said axle, said carrier members, conjointly, constituting a hub for the reception and support of a coil of wire, mechanism interconnecting said sleeve and said carrier members, said mechanism being operative in response to rotation of said sleeve relatively to said flanges to move said carrier members radially and synchronously whereby to expand and contract the peripheral diameter of said hub, a ratchet carried by and concentric with said sleeve, a dog carried by said web member and normally co-acting with said ratchet to lock said hub against contraction, said dog being withdrawable from said ratchet to permit contraction of said hub, and a brake for impeding rotation of said hub about said axle.

GEORGE DORN.
KENNETH G. WEYLAND.